(12) United States Patent
McNulty et al.

(10) Patent No.: US 12,717,728 B2
(45) Date of Patent: Aug. 25, 2026

(54) ASSISTED DOCKING SETUP FOR INFORMATION HANDLING SYSTEMS

(71) Applicant: Dell Products L.P., Round Rock, TX (US)

(72) Inventors: Kearson M. McNulty, Austin, TX (US); Trent A. Buys, Seattle, WA (US); Cherian Samuel Mathews, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 18/926,579

(22) Filed: Oct. 25, 2024

(65) Prior Publication Data

US 2026/0119411 A1 Apr. 30, 2026

(51) Int. Cl.
*G06F 13/10* (2006.01)

(52) U.S. Cl.
CPC .......... *G06F 13/10* (2013.01); *G06F 2213/40* (2013.01)

(58) Field of Classification Search
CPC ............................ G06F 13/10; G06F 2213/40
See application file for complete search history.

(56) References Cited

U.S. PATENT DOCUMENTS 11,809,229 B2 * 11/2023 Roose ............... H04M 1/72409
2004/0148445 A1 * 7/2004 Lee ...................... G06F 1/1632 710/72
2013/0145050 A1 * 6/2013 Huang .................. H04W 84/12 710/3
2016/0330625 A1 * 11/2016 Totzke .................... H04W 4/80
2019/0042503 A1 * 2/2019 Montero ............. G06F 13/4282
2020/0348723 A1 * 11/2020 Wood, III ............ G06F 13/385
2020/0349251 A1 * 11/2020 Iyer ........................ G06F 21/85
2024/0202528 A1 * 6/2024 Wang .................. G06N 3/0455

* cited by examiner

*Primary Examiner* — Farley Abad
(74) *Attorney, Agent, or Firm* — Fogarty LLP

(57) ABSTRACT

Systems and methods support docking of an Information Handling System (IHS) to a docking station. A default docking connection of the IHS to the docking station is detected, the connection providing use peripheral devices coupled to the docking station. Respective identities of the docking station and of the peripheral devices are determined. The respective identities are used to query a remote docking support service for a complete set of capabilities of the docking station and of the peripheral devices. Unused capabilities of the docking station or of the peripheral devices are identified that are supported by the IHS. The default docking connection is modified by configuring the IHS to utilize at least a portion of the unused capabilities of docking station or of the peripheral devices coupled to the docking station.

20 Claims, 3 Drawing Sheets

ASSISTED DOCKING SETUP FOR INFORMATION HANDLING SYSTEMS

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Various types of mobile IHSs are presently in use, including laptop computers, hybrid laptops that support multiple different physical configurations, tablet computers and smartphones. Some of these mobile IHSs may be coupled to a docking station that supports the use of the mobile IHS while at a workstation that is available at a fixed location. In providing a workstation for mobile IHSs, the docking station may support operation of the mobile IHS using various user devices, such as external displays, speakers, external keyboards and pointing devices. The docking station may also provide power and networking to a coupled IHS.

SUMMARY

In various embodiments, systems and methods include an Information Handling System (IHS) that may include: one or more processors; a memory device coupled to the one or more processors, the memory device storing computer-readable instructions that, upon execution by the one or more processors, cause the IHS to: detect a default docking connection of the IHS to a docking station providing use of a plurality of peripheral devices that are coupled to the docking station; determine respective identities of the docking station and of the peripheral devices coupled to the docking station; utilize the respective identities to query a remote docking support service for a complete set of capabilities of the docking station and of the peripheral devices coupled to the docking station; identify one or more unused capabilities of the docking station or of the peripheral devices coupled to the docking station that are supported by the IHS; and modify the default docking connection by configuring the IHS to utilize at least a portion of the one or more unused capabilities of docking station or of the peripheral devices coupled to the docking station.

In some embodiments, the plurality of peripheral devices comprise one or more displays. In some embodiments, the default docking connection comprises use of a first of the displays, and wherein the modification of the default docking connection comprises adding an unused second of the displays. In some embodiments, the default docking connection comprises use of first color definition file for operation of the one or more displays, and wherein the modification of the default docking connection comprises changing the color definition file. In some embodiments, a wireless user input device used to operate the IHS is not included in the default docking connection, and wherein the modification of the default docking connection comprises transfer of the wireless user input device to operation via the docking station. In some embodiments, the default docking connection comprise a first power transfer from the docking station to the IHS, and wherein the modification of the default docking connection comprises configuring a second power transfer from the docking station. In some embodiments, the second power transfer is provided via an unused wireless charging capability of the charging station. In some embodiments, the first power transfer is a USB power transfer that is terminated and the second power transfer is provided via use of a different power transfer protocol that supports greater power transfers than the protocol of the USB power transfer. In some embodiments, the default docking connection comprise use of a wired network connection with the docking station. In some embodiments, the modification of the default docking connection comprises terminating use of the wired network connection provided by the docking station and initiating use of wireless network controller of the IHS. In some embodiments, the identified one or more unused capabilities of the docking station comprise a wireless network connection, and wherein the modification of the default docking connection comprises configuration of the wireless network connection with the docking station. In some embodiments, the wireless network connection with the docking station is used as sideband signal pathway for support the modifications to the default docking connection.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
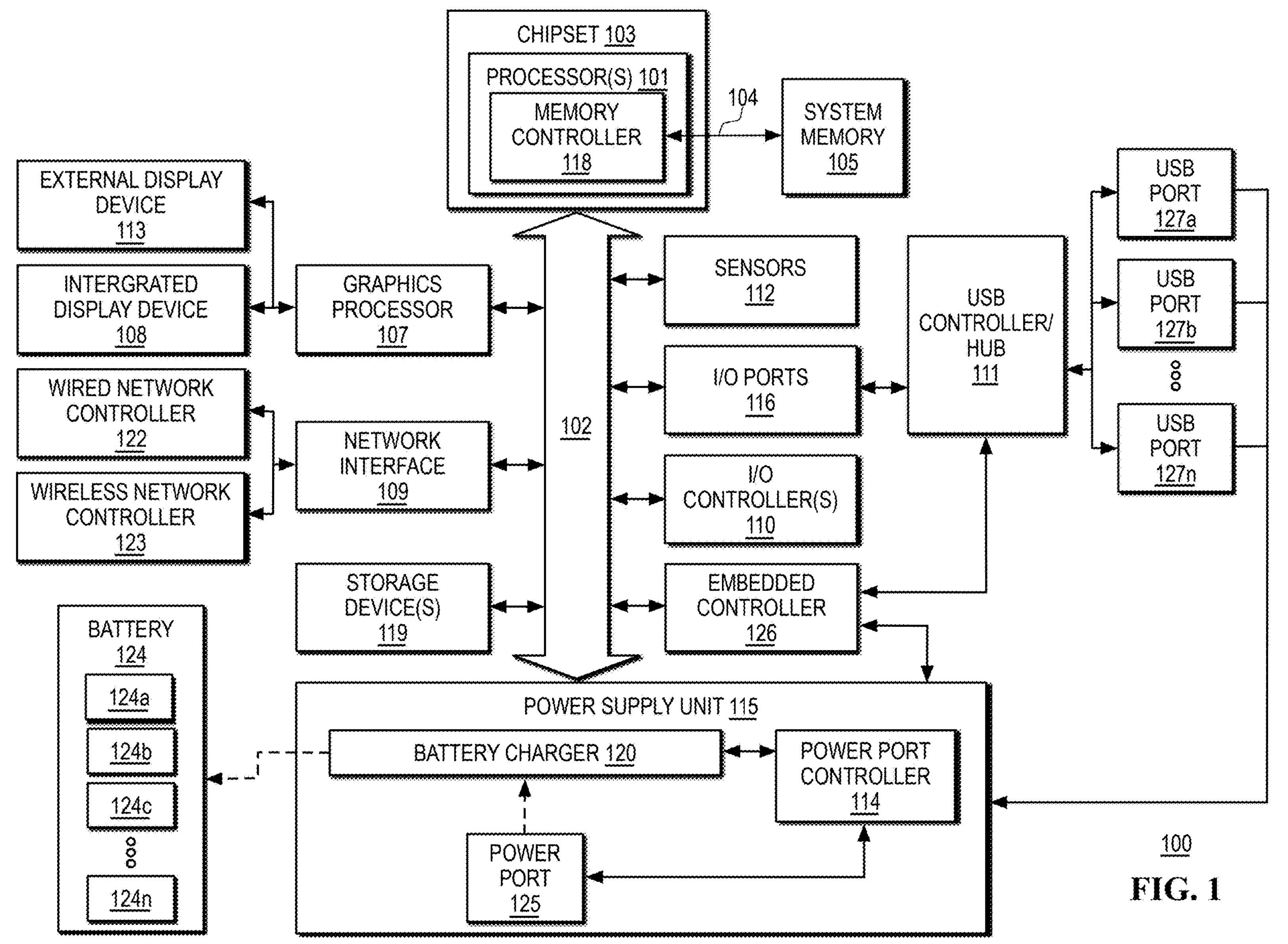
FIG. 1 is a block diagram depicting certain components of an IHS operable according to various embodiments for assisted docking of the IHS to a docking station.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, a user may transport a mobile IHS 100 between various locations that may include a docking station to which the IHS 100 may be coupled. By coupling the mobile IHS 100 to a docking station, one or more peripheral devices that are coupled to the docking station may be used in the operation of the mobile IHS 100 by a user. In addition, a docking station may provide power transfers and networking capabilities for use by a coupled IHS 100. Being an IHS 100 that is mobile, it may be used in a wide variety of locations and may thus be docked to a wide variety of docking stations. Some users may regularly dock an IHS 100 to the same home and/or office docking station, where these regularly used docking configurations to known docking stations may be relatively optimized with regard to maximizing the capabilities of the docking station and devices coupled to the docking station.

However, some office environments may not include fixed office assignments, such that an IHS 100 may be coupled to any of the docking stations that are made available within any of the docking stations available at any office locations. Similarly, some users may operate an IHS 100 in various forms of shared workspaces that provide communal or otherwise shared docking stations. While traveling, users may operate an IHS using a docking station provided by a hotel, airport or other shared workspace area. In such scenarios, the IHS may be regularly coupled to docking stations of different types, docking stations with different types of peripheral devices available, docking stations using different settings, etc. Due to such variances, an IHS 100 may be functionally coupled to a docking station though the use of default configurations, but these configurations may be sub-optimal with regard to fully utilizing the capabilities of a docking station, and the capabilities of the peripheral devices that are available for use via the docking station.

FIG. 1 is a block diagram depicting certain components of an IHS 100 operable according to various embodiments for assisted docking of the IHS to a docking station. In some embodiments, IHS 100 may be a laptop or tablet that may be coupled to a docking station that includes user I/O devices by which a user can operate the IHS 100. As described, an IHS 100 may be coupled to a docking station that may also provide power and networking to the IHS 100 in addition to providing use of various peripheral devices, that may include external display devices and user input devices such as keyboards and pointing devices. In order to support coupling of IHS 100 to recognized and unrecognized docking stations and to maximize use of the capabilities that are made available by each different docking station, embodiments include configuration of IHS 100 in a manner that provides assisted configuration of docking configurations, which such assisted configuration may be triggered upon detecting the IHS has been coupled to a docking station. Through embodiments, an IHS 100 may be configured to identify unused, available docking station capabilities and to configure use of available docking station capabilities. In some embodiments, IHS 100 may include an embedded controller 126 that may execute program instructions that implement the assisted docking procedures.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100. In some embodiments, wired and wireless network controllers 122, 123 may interface with a docking station to which IHS 100 has been coupled As described in additional detail below, network settings utilized by IHS 100 may be modified based on networking capabilities made available by a docking station to which the IHS is coupled, such as configuring use of local IHS wireless 123 connectively based on network connectivity provided by the docking station.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via a docking station. As described in additional detail below, display settings utilized by IHS 100, such as settings of graphics processor 107, may be modified based on display capabilities provided by the docking station to which the IHS is coupled, including based on the displays that are coupled to the docking station.

In certain embodiments, chipset 103 may utilize one or more I/O controllers 110 that may each support hardware components such as user I/O devices. For instance, I/O controller 110 may provide access to one or more user I/O devices such as a keyboard, mouse, touchpad, touchscreen, microphone, speakers, camera and other input and output devices that may be integrated components of the IHS or that may be external devices that are coupled to IHS 100. Each of the supported user I/O devices may interface with the I/O controllers through wired or wireless connections. In some instances, these I/O controllers 110 may be used in the operation of I/O devices that are available via a docking station to which IHS 100 is coupled. As described in additional detail below, setting supported by such I/O controllers 110 may be modified in order to utilize unused capabilities of peripheral devices that are available via a coupled docking station, such as terminating use of I/O controller for directly interfacing with user peripherals, such as a Bluetooth mouse, and instead relinquish control of the peripheral to the docking station, thus allowing the I/O controller to be placed in a low power mode.

In certain embodiments, IHS 100 may include sensors 112 that provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100. Such sensors 112 may capabilities for detecting when a user is detected within a certain proximity to IHS 100. For instance, sensors 112 may detect when a user is in close proximity to the IHS 100 and, in some cases, whether the user is facing the display(s) 108, 113. Sensors 112 may also detect when a user is not in close proximity to the IHS 100, but is nonetheless sufficiently nearby that the user may still be actively using IHS 100, such as by monitoring the progress of an application running on an IHS from across the room.

As indicated in FIG. 1, an IHS 100 may include one or more I/O ports 116 that support removeable couplings with various types of external devices. I/O ports 116 may include various types of ports and couplings that support connections with external devices and systems, either through temporary couplings via ports, such as HDMI ports, accessible to a user via the enclosure of the IHS 100, or through more permanent couplings via expansion slots provided via the motherboard or via an expansion card of IHS 100, such as PCIe slots. I/O ports 116 may include multi-use ports, such as USB ports, and may also include specialized ports, such as a specialized docking port. In some embodiments, the docking port may be a specialized docking connector that interfaces with a corresponding connector of the docking station, where the docking port connection may be a wired connection that utilizes a cable, or may be implemented through directly connecting an IHS docking connector to a corresponding connector of the docking station.

In embodiments where IHS 100 includes USB ports, IHS 100 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC (System on Chip) of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127*a-n*. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127*a-n* supported by IHS 100.

In some embodiments, USB controller 111 may control the distribution of both data and power transmitted via USB ports 127*a-n*. For instance, USB controller 111 may support data communications with USB devices that are coupled to the USB ports 127*a-n* according to data communication protocols set forth by USB standards. The power transmissions supported by USB controller 111 may include incoming charging inputs received via USB ports 127*a-n*, as well as outgoing power outputs that are transmitted from IHS 100 to USB devices that are coupled to USB ports 127*a-n*. In some embodiments, USB controller 111 may interoperate with embedded controller 126 in routing power inputs received via USB ports 127*a-n* to a battery charger 120 supported by the power supply unit 115 of IHS 100 and in routing power outputs from battery 124 to devices coupled to USB ports 127*a-n*. In some instances, power outputs provided from battery 124 to devices coupled to USB ports 127*a-n* may be supported by high-performance battery modes that may be used to rapidly charge the batteries of a device coupled to a USB port 127*a-n*.

In some embodiments, the multi-purpose USB port 127*a-n* connectors may be used as a docking interface between the IHS 100 and a docking station. In such instances, the USB controller 111 may manage a docking connection by which the IHS 100 may be operated by the user through the operation of peripheral devices that are coupled to the docking station. As described in additional detail below, the compatibility provided by use of a USB docking port connection by the IHS may provide support for docking of the IHS to a large variety of docking stations. Accordingly, the default capabilities of the USB controller 111 may suffice in negotiating a functional docking connection with a large variety of docking stations. However, these default configurations may result in suboptimal use of the capabilities of the docking station and of the peripheral devices that are available via the docking station. As described in additional detail below, a default docking port connection may be utilized upon coupling an IHS to a docking station, but embodiments provide assisted configuration of improved docking settings based on unused capabilities of the docking station and peripheral devices, thus expanding or otherwise improving the capabilities provided by the default docking port connection.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) that may be stored in a non-volatile memory accessible by chipset 103 via bus 102. In some embodiments, BIOS may be implemented using a dedicated microcontroller coupled to the motherboard of IHS 100. In some embodiments, BIOS may be implemented as operations of embedded controller 126. Upon powering or restarting IHS 100, processor(s) 101 may utilize BIOS instructions to initialize and test hardware components coupled to the IHS 100. The BIOS instructions may also load an operating system for use by the IHS 100. The BIOS provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124*a-n* using the available charging inputs. Embedded controller 126 may support routing and use of power inputs received via a USB port 127*a-n* and/or via a power port 125 supported by the power supply unit 115. In addition, operations of embedded controller 126 may interoperate with power supply unit 115 in order to provide battery status information, such as the charge level of the cells 124*a-n* of battery 124.

In some embodiments, embedded controller 126 may also interface with power supply unit 115 in monitoring the battery state of battery 124, such as the relative state of charge of battery 124, where this charge level of the battery 124 may be specified as a percentage of the full charge capacity of the battery 124. In some instance, when operating from power stored in battery system 124, embedded controller 126 may detect when the voltage of the battery system 124 drops below a low-voltage threshold. When the charge level of battery 124 drops below such a low-voltage threshold, embedded controller 126 may transition the IHS to an off-power state in implementing a battery protection mode that preserves a minimal power level in battery 124.

Embedded controller 126 may also implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together, such that the IHS is in a closed position. In response to lid position sensor detecting latching of the lid of IHS 100, embedded controller 126 may initiate operations for shutting down IHS 100 or placing IHS 100 in a low-power mode.

In this manner, IHS 100 may support the use of various power modes. In some embodiments, the power modes of IHS 100 may be implemented through operations of the embedded controller 126 and power supply unit 115. In various embodiments, a mobile IHS 100 may support various low power modes in order to reduce power consumption and/or conserve power stored in battery 124. The power modes may include a fully on state in which all, or substantially all, available components of mobile IHS 100 may be fully powered and operational. In a fully off mode, processor(s) 101 may powered off, any integrated storage devices 119 may be powered off, and/or integrated displays 108 may be powered off.

In an intermediate low-power mode, various components of mobile IHS 100 may be powered down, but mobile IHS 100 remains ready for near-immediate use. In a standby power mode, which may be referred to as a sleep state or hibernation state, state information may be stored to storage devices 119 and all but a selected set of components and low-power functions of mobile IHS 100, such as standby functions supported by embedded controller 126, are shut down. In some embodiments, IHS 100 may include various high-power battery modes that may be used to support peak power demands for short durations. Such high-power battery modes allow the IHS to support high-performance computing tasks, but may result in rapid discharge of available battery power.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a supply of DC power. The DC power input received at power port 125 may be utilized by a battery charger 120 for recharging one or more internal batteries 124 of IHS 100. As illustrated, batteries 124 utilized by IHS 100 may include one or more cells 124*a-n* that may connected in series or in parallel. Power supply unit 115 may support various modes for charging the cells 124*a-n* of battery 124 based on the power supply available to IHS 100 and based on the charge levels of the battery system 124. In certain embodiments, power supply unit 115 of IHS 100 may include a power port controller 114 that is operable for configuring operations by power port 125. In certain embodiments, power port controller 114 may be an embedded controller that is a motherboard component of IHS 100, a function supported by a power supply unit 115 embedded controller, or a function supported by a system-on-chip implemented by processors 101.

As indicated in FIG. 1, power supply unit 115 may receive and transmit power inputs via USB ports 127*a-n* of the IHS. In a similar manner, power supply unit 115 may receive power inputs from any other I/O ports that support docking connections. As described in additional detail below, whether through a USB port or a dedicated docking port, default docking connections may utilize suboptimal power transfers from the docking station. Moreover, default docking connections may not account for the status of the battery 124 of the IHS, and thus may not account for any need to prioritize rapid charging of the battery using all available power transfers from the docking station. As described in additional detail below, embodiments may evaluate the complete power transfer capabilities of the docking station in determining whether the current charging of the batteries 124 may be improved.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
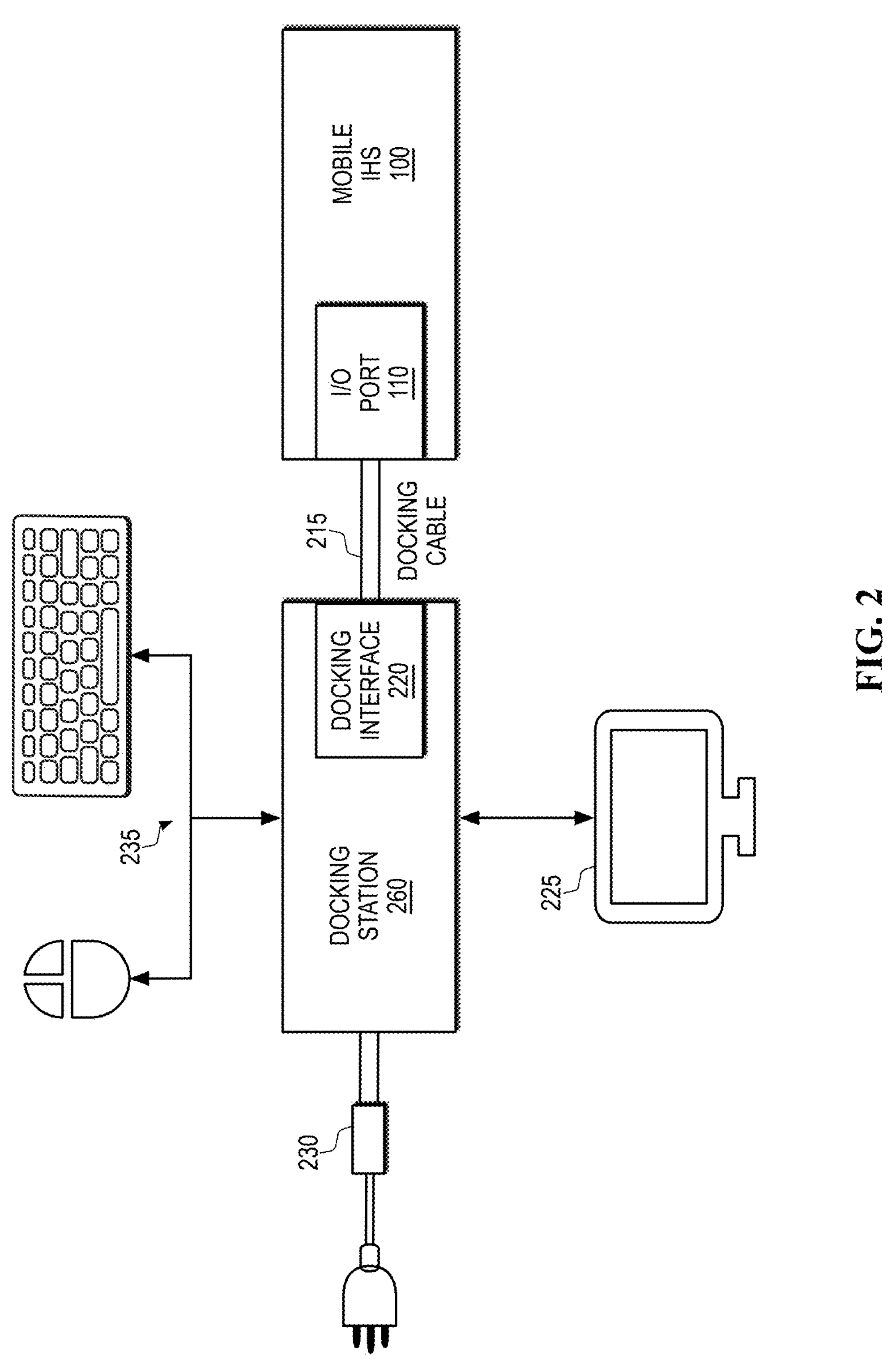
FIG. 2 is a block diagram depicting certain components of a docking system configured according to various embodiments for supporting assisted docking of an IHS to a docking station.

FIG. 2 is a block diagram depicting certain components of a docking system configured according to various embodiments for supporting assisted docking of an IHS 100, such as described with regard to FIG. 1, to a docking station. As described above, an IHS 100 may utilize different docking stations 260 in a variety of different locations, and thus in a variety of different scenarios. As illustrated, a docking station 260 may provide a user of IHS 100 with use of one or more external displays 225. A docking station 260 may also provide use of various additional peripheral I/O devices 235, such as a mouse and keyboard, which may be coupled to the docking station 260 via wired or wireless connections. While coupled to a docking station 260, mobile IHS 100 may be configured such that all user inputs and outputs generated in the operation of the IHS 100 are provided via docking station 260.

As illustrated, an IHS 100 may be coupled to a docking station 260 via a docking cable 215. As described above, this docking cable 215 may be a USB cable for some docking stations 260. As indicated in FIG. 2, the docking station 260 may include a docking interface 220 that receives one end of the docking cable 215, and the IHS 100 includes an I/O port 110 that receives the other end of the docking cable 215. In other types of docking interfaces, the IHS 100 may be coupled directly to a docking station, such as via mating of an external, specialized connector of the IHS with a compatible connector provided by the docking station.

In FIG. 2, a docking cable 215 is used to connect the docking station 260 and the IHS 100. In some docking scenarios, a wireless connection may be used to couple the IHS 100 to the docking station 260. In scenarios where wireless couplings are supported between the IHS 100 and docking station, wired couplings may also be supported. In such instances, wired docking cables 215 may be used for transmission of power from the docking station 260 to the IHS 100, while certain functions supported by the docking station 260, such as networking, may be supported in full or in part through wireless connections between the docking station 260 and IHS 100.

For instance, in some embodiments, a docking station 260 may include a capability by which the docking station 260 broadcasts a wireless signal identifying the docking station 260, and in certain instances, also identifying the devices coupled to the docking station 260. As described in additional detail below, this collected identity information for docking station 260 and coupled peripherals may be used in querying a full set of capabilities of the docking station and of the coupled peripherals. Embodiments may utilize this capability information in assessing whether the capabilities supported by the docking station may be more fully utilized.

As illustrated, a docking station 260 may include an AC adapter 230 by which the docking station 260 receives DC power. The docking station 260 may use the received DC power to provide power to IHS 100. Through embodiments, the extent of the power transfer capabilities of the docking station 260 may be identified and used in evaluating whether to modify the ongoing power transfers via the docking cable 215 to the IHS 100. In some scenarios, the default power transfers may be sufficient to power the IHS 100 and initiate charging of the IHS batteries 124. However, in embodiments, default docking configurations and unused power transfer capabilities of the docking station 260 are identified and utilized in order to facilitate more rapid charging of the IHS batteries 124 while docked.

Figure 3:
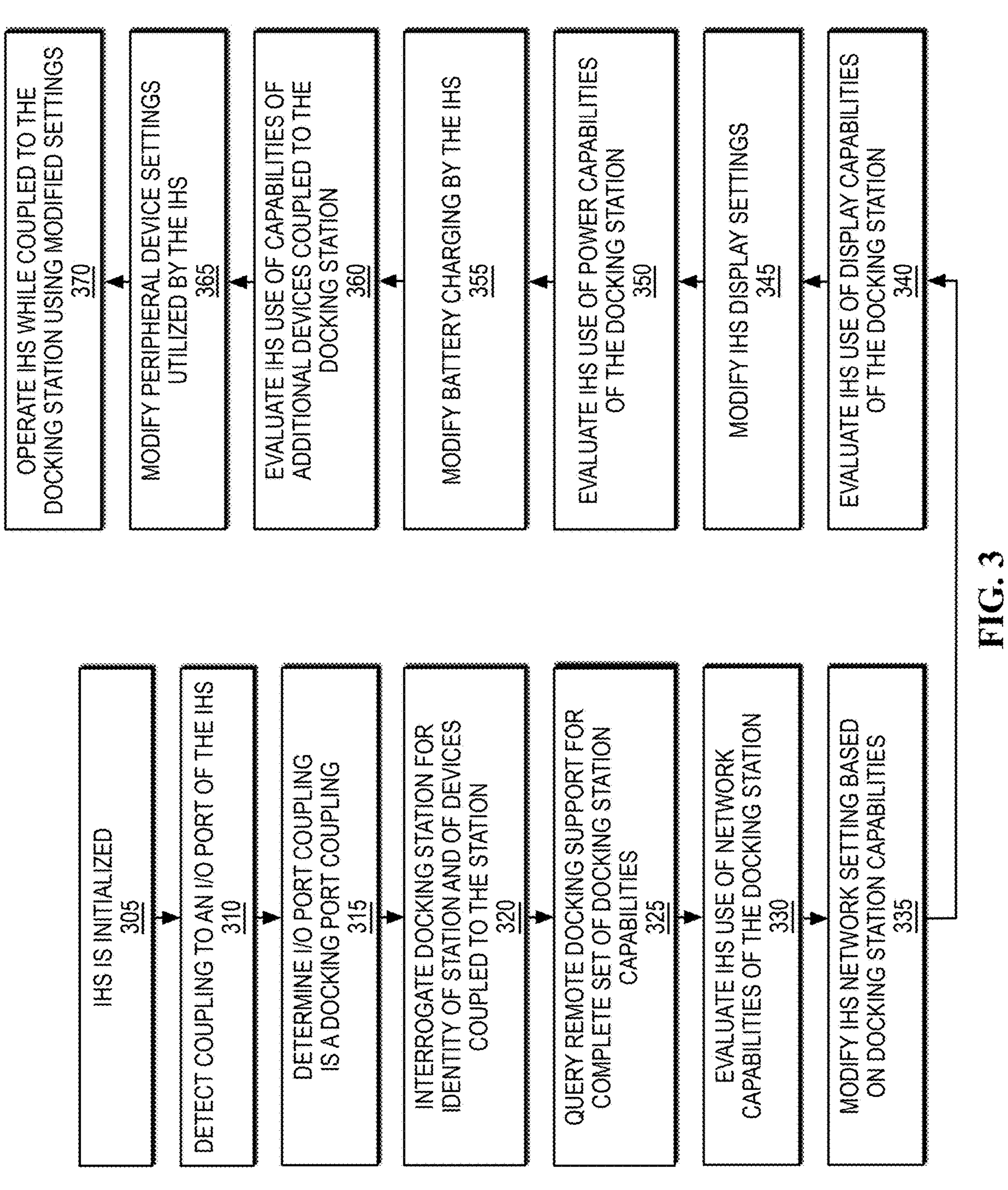
FIG. 3 is a flow chart diagram illustrating certain additional steps of a process according to various embodiments for assisted docking of an IHS to a docking station.

FIG. 3 is a flow chart diagram illustrating certain steps of a process according to various embodiments for assisted docking of an IHS 100 to a docking station. As illustrated, embodiments may begin, at 205, with the initialization of a laptop or other IHS that may be coupled to a docking station, such as an IHS 100 described with regard to FIG. 1. Once the IHS has been initialized, the operating system of the IHS is booted and the user may commence operation of the IHS and may thus initiate use of software applications that are supported by the operating system. The IHS may be operated for any amount of time in the manner, when, at 310, embodiments detect the physical coupling of a device to an I/O port 110 of the IHS. In some scenarios, the I/O port 110 coupling may be connected while the IHS is off or otherwise in a low-power state, such that an I/O coupling may detected as part of the initialization of the IHS 100.

Upon the detection of the I/O port 110 coupling, at 315, embodiments determine whether the coupling is a docking port connection for docking the IHS 100 to a docking station 260. In some embodiments, the I/O port 110 may be specialized docking port such that any coupling detected at this port indicates a docking port connection. In some embodiments, the I/O port 110 may be a USB port or other multi-purpose port that may support docking port connections as well as a variety of other types of connections. In some embodiments, a USB docking station coupling may be identified by the IHS 100, such as by USB controller 111, based on specific device class codes other device identifier specified in USB descriptors used by the docking station in establishing the connection. As described above, in some instances, a default docking port connection may be established upon detection of the docking station connection to the I/O port. This default docking port connection may provide a functional docking configuration, but may leave capabilities of the docking station underutilized or entirely unused.

As indicated in FIG. 3, once the I/O port coupling has been determined to be a docking port coupling, at 320, embodiments may utilize the connection to interrogate the docking station for its identity, as well as the identities of the peripheral devices that are currently coupled to the docking station and available for use by the IHS 100. In some embodiments, some or all of this identity information, such as model numbers or other device class identifiers, may have been collected as part of the handshake by which the default docking port connection has been established, such as a default docking port coupling using default USB connections for each of the peripheral devices that are coupled to the docking station.

As described above, some interrogation of the docking station 260 may be conducted via wireless signaling. In some embodiments, such wireless signaling between the IHS 100 and docking station 260 may be initiated as soon as the IHS 100 is in signaling proximity to the docking station, thus allowing the IHS to expedite identification of the docking station 260 and thus to expedite remote queries to a docking support service for use in assisting in identifying and configuring unused docking station capabilities.

Once the identities of the docking station and the coupled peripheral devices has been established, at 325, a remote docking support service is queried for a complete set of capabilities of the identified docking station, as well as a complete set of capabilities of the peripheral devices based on their respective couplings to the docking station. As described, an IHS may be used at different locations and thus using different docking stations. In many instances, the IHS may be functionally docked using the default docking settings supported by the operating system, but such default configurations may result in suboptimal use of docking station capabilities such that the docking support service may identify multiple unused hardware and software capabilities of the docking station and coupled peripherals.

In some embodiments, the docking support service may be provided by the manufacturer of the IHS, or another trusted entity, and provided to the user of the IHS as part of a contract for ongoing support of the IHS. In some instances, the docking support service may be provided by an employer that provides the user with use of the IHS 100 and of docking stations at one or more locations. In some embodiments, the docking support service may be provided by an organization that supports the use of docking stations at one or more locations. For instances, a business or educational institution providing shared workspaces with docking stations at multiple different locations, may provide the docking support service for use in assisting users in taking advantage of unused capabilities of the docking station and of the peripheral devices that are coupled to the docking station. The docking support service may interface with any number of other similar services and data sources to determine the full set of capabilities of the docking station and of the peripheral devices coupled to the docking station.

Upon ascertaining the docking station capabilities, at 330, embodiments may begin evaluation of these capabilities versus that current settings in use by the default docking port connection. As described above, in some instances, an IHS 100 may communicate with a docking station via wireless signaling, such as via short-range Bluetooth wireless communications. However, in some instances, available wireless connectivity between the IHS 100 and the docking station may not be part of the default, wired docking port I/O coupling, and thus is not used as part of the default docking connection.

In such scenarios, some embodiments may utilize such wireless signaling supported by the docking station for the remaining communications between the IHS 100 and docking station in the assisted docking configuration described herein. In this manner, embodiments may utilize the wireless signaling pathway as a sideband communication pathway for use in assisted configuration of the docking station capabilities by the IHS 100. In scenarios where a default, wired docking port coupling is utilized, such default docking couplings do not include any configuration of wireless connectivity that may be available. Accordingly, default docking port couplings may leave this docking station capability unused.

Moreover, use of a default docking port coupling may result in the use of only the docking settings that are supported by this default coupling. In such instances, the docking station and the peripheral devices coupled to the docking station may have additional capabilities that are not accounted for, or even supported by, the default docking port coupling. Through the use of the wireless signaling pathway, embodiments may identify and configure settings of the docking station and coupled peripherals that are not recognized by the default docking port connection, thus leaving these docking station capabilities unused, or at least underutilized. In some scenarios, the use of the wireless signaling pathway may support configuration of peripherals and capabilities that are not recognized by the default docking port connection such that it does not provide any mechanism that is capable of recognizing or configuring these unrecognized capabilities.

In scenarios where wireless communications between the IHS 100 and docking station are supported, the main docking connection may be via a cable between the docking station and a docking port connection of the IHS 100, such as a USB connector of the IHS or such as a specialized docking port coupling supported by the IHS. In some instances, the wired docking port connection may provide the IHS with networking capabilities supported by the docking station. For instance, the docking station may be connected to a high-bandwidth network connection via a wired network connection, such as a wired Ethernet connection to a local network switch. In such instances, the docking port connection established via the wired docking station coupling may provide the IHS with a wired, high-bandwidth network connection. In other instances, the wired docking port connection may support more limited network capabilities that may be utilized by the IHS.

In some instances, the default docking connection may be limited to configuration of user peripheral devices and power transmissions, and may thus omit any configuration of network capabilities provided by the docking station. Accordingly, a default docking configuration may leave available docking station networking capabilities unused, or at least underutilized. In some embodiments, the evaluation of the available network capabilities may include an evaluation of the current network speeds supported by all network connections supported by the IHS, excluding those network connections available via the docking station. In such embodiments, embodiments may initiate a network speed test of the wireless and wired network connections of the IHS 100 that are available, such as any Wi-Fi, Bluetooth, or wired Ethernet connections that are accessed by the IHS independently from the docking station, whether to communicate via external networks (e.g., the Internet), via internal networks, or with other devices, such as using Bluetooth connections with nearby devices.

This evaluation of networking capabilities by embodiments may continue with an evaluation of the network speeds that are supported via the network connections provided by the docking station, whether via the wired docking port I/O coupling or via a wireless connection with the docking station. Embodiments may confirm that the network settings and capabilities in use by the docking station are the maximum capabilities that are supported, as based on the complete set of docking station networking capabilities, such as maximum network speeds, identified by the docking support service. For instance, the docking station may support additional high-speed wireless connections with an IHS, such as via Wi-Fi, but the IHS may not recognize this capability during default docking procedures. Accordingly, in such instances, the default network speed settings in use by the docking station may not be the maximum speeds supported by the docking station.

Based on such evaluations of the network capabilities provided by or otherwise supported by the docking station versus other network connections available to the IHS, at 335, the IHS may modify one or more of the network settings of the IHS and/or docking station. For instance, embodiments may increase the network speed or other such sub-optimal network settings in use by the docking station. In some instances, the network speed tests may indicate that a wired network docking port connection provided by the docking station is significantly faster than the wireless connections available to the IHS 100. In such instances, embodiments may configure use of the network connection supported by the docking port connection and may place the wireless network controller of the IHS in a low power mode.

Conversely, embodiments may choose to rely on faster Wi-Fi network connection provided by the IHS network controller 123 and defer use of the network connections provided by the docking station. In some embodiments, such selection of network connections may include prompting the user of the IHS for confirmation of the network connection to be used. Some users may prefer use of a slower, but more trusted, Wi-Fi controller 123 connection by the IHS 100 over a faster connection provided by a public docking station. In another scenario, the IHS may utilize Bluetooth to interface with a wireless user input device, such as a mouse or keyboard. In such instances, the network capabilities of the docking station may indicate an ability to pair with certain Bluetooth user input devices and incorporate their use into the wired docking connection that is in use, thus freeing the IHS from operation of these devices. Embodiment may thus support releasing connections with these user input devices to allow their pairing directly with the docking station, thus allowing the Bluetooth controller of the IHS to be placed in a low-power mode and thus to utilize all available power being drawn from the docking station for charging of the batteries of the IHS.

In this manner, the network capabilities of the docking station may be evaluated and compared to the network connections that are otherwise available to the IHS in order to evaluate any unused or underutilized network capabilities of the docking station. Embodiments may continue, at 340, with evaluation of the display capabilities of the docking station, where this evaluation may compare the external display capabilities available to the IHS 100 via the docking station versus the display settings that are currently in use.

In some scenarios, a docking station may include multiple displays for use by a coupled IHS. In such instances, the default docking configuration that is used when coupling the IHS to the docking station may only include use of one of these external displays, such as to due the extra configurations required to setup extended display options for seamless use of multiple external displays as a single display. In such instances, embodiments may prompt the user to confirm whether use of single display is desired, such as in a travel scenario where this docking station will only be used for a short amount of time. If requested, at 345, the user may be provided with operating system options for configuring the use of multiple displays of the docking station as an extended desktop.

In another scenario, the default display settings used by the docking port connection may not be the maximum display settings that are supported. For instance, the default docking port connection may utilize a default display configuration that does not utilized the maximum resolution or the fastest frame rate that is supported by the display that is coupled to the docking station. In some scenarios, the complete set of docking station display capabilities and of the displays that are coupled to the docking station, as identified by the docking support service, may indicate that the higher resolutions and/or faster frame rates are supported by both the docking station and the display coupled to the docking station. Some embodiments may configure, at 345, the use of a higher resolutions and/or faster frame rates automatically, while other embodiment may prompt the user for confirmation before making such adjustments. In some embodiments, such configurations of display resolutions or other display settings may be selected via a sideband wireless connection between the IHS 100 and the docking station, as described above, since such display setting modifications may not be supported by the interface in use by the default, wired docking connection.

Evaluation of the display settings may continue with an evaluation of the color definition files that are in use to render colors on the display(s) that are coupled to the docking station. In some embodiments, the graphics processor 107 may utilize one or more color definition files, such as ICC (International Color Consortium) or ICM (Image Color Management or Input Characterization Model) files, that define the display of specific colors by a specific device, such as by a specific integrated display device 108 of an IHS, or by a specific external display 113 that may be accessed by the IHS via a docking station. Such color definition files specify color characteristics of a specific display device and provides instructions for use by a graphics processor for converting colors of content to be displayed to a color space that is supported by the display device. In some instances, the operating system of the IHS 100 may manage a library of supported color definition files.

A default docking port connection may be established using default, generic color definition files that provide functional color settings, but that are not optimized with regard to the color capabilities of the displays. Embodiments may thus compare the color definition files that are supported by the display(s) that are coupled to the docking station to the color definition files that are in use by the graphics processor 107 in rendering content on each of these displays. In some instances, the resulting modifications, at 345, to the display settings of the IHS may include changes to the color definition file(s) in use by the graphics processor 107.

For instance, the default docking port connection may configure use of a generic color definition file that may be sufficient for one of multiple displays coupled to the docking station, but may fail to take advantage of advanced color settings that are supported by a second of these displays. Embodiments, may adjust IHS display settings for use of the optimal color definition file for display of content by this second display. In this manner, embodiments may confirm that the display settings and capabilities in use by the docking station are the maximum capabilities that are supported, as based on the complete set of docking station display capabilities identified by the docking support service.

Embodiments may continue, at 350, with evaluation of the power transfer capabilities of the docking station, where this evaluation may consider the complete power transfer capabilities available to the IHS 100 from the docking station relative to the current power needs of the IHS, in particular power needs for charging the batteries of the IHS 100. As described, a docking port connection may be established through use of a multipurpose wired connection between the IHS and the docking station, such as via a wired USB connection. In such scenarios, a docking station may use this wired USB connection to transmit power to the IHS, thus providing the IHS with a source of power for charging its batteries over the same wired connection used to transmit the docking session data. Such transmissions of power may thus be limited to the power transfers that are supported by the USB protocol.

In USB scenarios, the default docking port connection may configure use of USB-PD (Power Delivery) power transmission by the docking station. Through evaluation of the complete power transfer capabilities of the docking station identified by the docking support service, embodiments may determine that both the IHS 100 and docking station both jointly support higher-power transmissions, such as through specialized turbo power modes that transfer power over USB cabling through the operations of specialized USB controllers 111. For instance, specialized USB controllers of the IHS 100 and docking station may interoperate in transmission of power at the limits of the USB cabling used in the docking port connection, but above power transmission levels supported by power transmission according to USB protocols.

In this manner, embodiments may identify and utilize additional power transfer capabilities that are supported by a docking station. In another scenario, the wired docking port connection may include support for power transfers and the docking station may also support wireless charging for use by the IHS or by a companion device, such as a mobile phone. In such instances, embodiments may identify this unused capability of the docking station and, at 355, may prompt the user for activation of this additional charging capability. In response, embodiments may notify the docking station to activate the wireless charging capabilities of the docking station and may modify the battery 124 charging capabilities of the IHS to utilize the wireless charging provided by the docking station. Some embodiments may support redundant charging through the wireless charging and the wired docking port connection. In embodiments where redundant charging is not supported, embodiments will select use of the charging mechanisms that provide the most rapid charging of the IHS batteries.

In some scenarios, power transfer modes may be jointly supported by docking stations and IHS 100 that support prioritized use of power for charging of a device that is coupled to an I/O port of the IHS, such as prioritizing charging of a mobile phone that is coupled to the IHS 100 via a USB 127*a-n* coupling. Embodiments may identify such prioritized charging of a USB device coupled to a USB port 127*a-n* using power from the docking station as an unused capability of the docking configured. Once such capability is identified in the complete set of capabilities and confirmed as supported by the IHS 100 and docking station, the use of this prioritized charging of coupled USB devices in lieu of charging the IHS batteries may be presented to the user. In selected by the user, embodiments may initiate prioritized charging of a USB device that is connected to the IHS using power received from the docking station, and forgoing use of some or all of the docking station power to charge the batteries 124 of the IHS 100.

In this manner, the power capabilities of the docking station may be evaluated and compared to the ongoing power transfers from the docking station in order to identify any additional power transfers that may be supported in order to reduce the time required to fully charge the IHS batteries, or to redirect power transfers to other coupled devices. Embodiments may continue, at 360, with evaluation of the capabilities of other devices connected to the docking station, where this evaluation identifies any such capabilities that are not presently configured for use as part of the docking connection. For instance, a docking station may include an external camera that is not connected to the IHS as part of a default docking connection, but that may be added, at 365, upon prompting the user for confirmation. In this same manner, devices such as printers, speakers, VoIP telephones, smart whiteboards, etc., may be identified as unused capabilities of a docking station and may then be incorporated into the ongoing docking port connection.

Through these evaluations, embodiments may provide assisted configuration of an ongoing docking session in a manner that identifies unused or underutilized capabilities of the docking station and/or peripheral devices coupled to the docking station. In some embodiments, the assisted docking configuration described herein may run as a process of the operating system of the IHS. In such embodiments, the assisted docking configuration service may operate as user application of the operating system, providing the user with one or more graphical interfaces by which to accept or reject suggested modifications to the ongoing docking session, such as the described prompts requesting the user to confirm network connections, display settings, power transfers and additional peripheral devices to be utilized. In some embodiments, some or all of the assisted docking configuration service may be operated by an embedded controller 126 of the IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
- one or more processors;
- a memory device coupled to the one or more processors, the memory device storing computer-readable instructions that, upon execution by the one or more processors, cause the IHS to:
  - detect a default docking connection of the IHS to a docking station providing use of a plurality of peripheral devices that are coupled to the docking station, wherein the plurality of peripheral devices comprises one or more displays, and wherein the default docking connection comprises use of a first display of the plurality of displays;
  - determine respective identities of the docking station and of the peripheral devices coupled to the docking station;
  - utilize the respective identities to query a remote docking support service for a complete set of capabilities of the docking station and of the peripheral devices coupled to the docking station;
  - identify one or more unused capabilities of the docking station or of the peripheral devices coupled to the docking station that are supported by the IHS; and
  - modify the default docking connection by configuring the IHS to utilize at least a portion of the one or more unused capabilities of docking station or of the peripheral devices coupled to the docking station, wherein the modification of the default docking connection comprises adding an unused second display of the plurality of displays.

2. The IHS of claim 1, wherein the default docking connection further comprises use of first color definition file for operation of the one or more displays, and wherein the modification of the default docking connection further comprises changing the color definition file.

3. The IHS of claim 1, wherein a wireless user input device used to operate the IHS is not included in the default docking connection, and wherein the modification of the default docking connection further comprises transfer of the wireless user input device to operation via the docking station.

4. The IHS of claim 1, wherein the default docking connection further comprises a first power transfer from the docking station to the IHS, and wherein the modification of the default docking connection further comprises configuring a second power transfer from the docking station.

5. The IHS of claim 4, wherein the second power transfer is provided via an unused wireless charging capability of the docking station.

6. The IHS of claim 4, wherein the first power transfer is a USB power transfer that is terminated and the second power transfer is provided via use of a different power transfer protocol that supports greater power transfers than the protocol of the USB power transfer.

7. The IHS of claim 1, wherein the default docking connection further comprises use of a wired network connection with the docking station.

8. The IHS of claim 7, wherein the modification of the default docking connection further comprises terminating use of the wired network connection provided by the docking station and initiating use of wireless network controller of the IHS.

9. The IHS of claim 1, wherein the identified one or more unused capabilities of the docking station comprise a wireless network connection, and wherein the modification of the default docking connection further comprises configuration of the wireless network connection with the docking station.

10. The IHS of claim 9, wherein the wireless network connection with the docking station is used as a sideband signal pathway for supporting the modification of the default docking connection.

11. A method for assisted docking configurations for an Information Handling System (IHS), the method comprising:
- detecting a default docking connection of the IHS to a docking station providing use of a plurality of peripheral devices that are coupled to the docking station, wherein the default docking connection comprises a first power transfer from the docking station to the IHS;

determining respective identities of the docking station and of the peripheral devices coupled to the docking station;

utilizing the respective identities to query a remote docking support service for a complete set of capabilities of the docking station and of the peripheral devices coupled to the docking station;

identifying one or more unused capabilities of the docking station or of the peripheral devices coupled to the docking station that are supported by the IHS; and modifying the default docking connection by configuring the IHS to utilize at least a portion of the one or more unused capabilities of docking station or of the peripheral devices coupled to the docking station, wherein the modification of the default docking connection comprises configuring a second power transfer from the docking station to the IHS.

12. The method of claim 11, wherein the plurality of peripheral devices comprise one or more displays, and wherein the default docking connection further comprises use of a first of the displays, and wherein the modification of the default docking connection further comprises adding an unused second of the displays.

13. The method of claim 11, wherein the second power transfer is provided via an unused wireless charging capability of the charging docking station.

14. The method of claim 11, wherein the default docking connection further comprises use of a wired network connection with the docking station, and wherein the modification of the default docking connection further comprises terminating use of the wired network connection provided by the docking station and initiating use of wireless network controller of the IHS.

15. A non-transitory computer-readable storage device having instructions stored thereon for assisted docking configurations for an Information Handling System (IHS), wherein execution of the instructions by one or more processors of the IHS causes the one or more processors to:

detect a default docking connection of the IHS to a docking station providing use of a plurality of peripheral devices that are coupled to the docking station, wherein the default docking connection comprises use of a wired network connection with the docking station;

determine respective identities of the docking station and of the peripheral devices coupled to the docking station;

utilize the respective identities to query a remote docking support service for a complete set of capabilities of the docking station and of the peripheral devices coupled to the docking station;

identify one or more unused capabilities of the docking station or of the peripheral devices coupled to the docking station that are supported by the IHS; and modify the default docking connection by configuring the IHS to utilize at least a portion of the one or more unused capabilities of docking station or of the peripheral devices coupled to the docking station, wherein the modification of the default docking connection comprises terminating use of the wired network connection provided by the docking station and initiating use of wireless network controller of the IHS.

16. The non-transitory computer-readable storage device of claim 15, wherein the plurality of peripheral devices comprise one or more displays, and wherein the default docking connection further comprises use of a first of the displays, and wherein the modification of the default docking connection further comprises adding an unused second of the displays.

17. The non-transitory computer-readable storage device of claim 15, wherein the default docking connection further comprises a first power transfer from the docking station to the IHS, and wherein the modification of the default docking connection further comprises configuring a second power transfer from the docking station.

18. The non-transitory computer-readable storage device of claim 17, wherein the first power transfer is a USB power transfer that is terminated and the second power transfer is provided via use of a different power transfer protocol that supports greater power transfers than the protocol of the USB power transfer.

19. The non-transitory computer-readable storage device of claim 15, wherein a wireless user input device used to operate the IHS is not included in the default docking connection, and wherein the modification of the default docking connection further comprises transfer of the wireless user input device to operation via the docking station.

20. The non-transitory computer-readable storage device of claim 15, wherein the plurality of peripheral devices comprise one or more displays, and wherein the default docking connection further comprises use of first color definition file for operation of the one or more displays, and wherein the modification of the default docking connection further comprises changing the color definition file.

* * * * *